(12) United States Patent
Deng et al.

(10) Patent No.: US 12,528,639 B2
(45) Date of Patent: Jan. 20, 2026

(54) FEEDING CONTAINER DEVICE

(71) Applicant: SHENZHEN BONA PHARMA TECHNOLOGY CO., LTD., Guangdong (CN)

(72) Inventors: Yunhua Deng, Guangdong (CN); Kai Qing, Guangdong (CN)

(73) Assignee: Shenzhen Bona Pharma Technology Co., Ltd., Shenzhen (CN)

( * ) Notice: Subject to any disclaimer, the term of this patent is extended or adjusted under 35 U.S.C. 154(b) by 34 days.

(21) Appl. No.: 18/400,863

(22) Filed: Dec. 29, 2023

(65) Prior Publication Data

US 2024/0132275 A1 Apr. 25, 2024
US 2024/0228153 A9 Jul. 11, 2024

Related U.S. Application Data

(63) Continuation-in-part of application No. 17/263,152, filed as application No. PCT/CN2018/102387 on Aug. 27, 2018, now Pat. No. 11,905,085.

(30) Foreign Application Priority Data

Jul. 26, 2018 (CN) .......................... 201810834915.0

(51) Int. Cl.
*B65D 83/682* (2025.01)
*B65D 51/28* (2006.01)

(52) U.S. Cl.
CPC ....... *B65D 83/682* (2013.01); *B65D 51/2864* (2013.01); *B65D 2211/00* (2013.01); *B65D 2539/006* (2013.01)

(58) Field of Classification Search
CPC .......................... B65D 51/2871; B65D 51/18; B65D 51/2892; B65D 81/3211; B65D 51/2864; B65D 83/682
USPC ........................................................ 206/219
See application file for complete search history.

(56) References Cited

U.S. PATENT DOCUMENTS

| | | | | |
|---|---|---|---|---|
| 3,355,238 A | * | 11/1967 | Schwartzman | ...... B65D 47/248 401/41 |
| 4,178,049 A | * | 12/1979 | Loo | ........................ A47B 88/57 312/334.47 |
| 6,003,728 A | * | 12/1999 | Elliott | ................ B65D 47/0804 222/129 |
| 2011/0204060 A1 | * | 8/2011 | Suzuki | ............... B65D 51/2871 220/521 |

(Continued)

*Primary Examiner* — Steven A. Reynolds
(74) *Attorney, Agent, or Firm* — IPRTOP LLC

(57) ABSTRACT

The present disclosure provides a feeding container device, including a bottle body having a bottle inner cavity, a first cover body at least partially disposed inside the bottle inner cavity and fixedly connected to the bottle body, a second cover body at least partially disposed inside the bottle inner cavity and having a cover inner cavity, a sealing ring disposed inside the bottle inner cavity and blocking the cover inner cavity, and a feeding device fixedly connected to the second cover body, the second cover body is mounted to the bottle body, the sealing ring is detachably connected to the second cover body and abuts the first cover body; when the second cover body moves away from the bottle body, the first cover body causes the sealing ring to separate from the second cover body, and the first sealed chamber communicates with the second sealed chamber.

17 Claims, 8 Drawing Sheets

(56) References Cited

U.S. PATENT DOCUMENTS

| | | | | |
|---|---|---|---|---|
| 2012/0305519 A1* | 12/2012 | Lee | .................... | B65D 47/2006 |
| | | | | 215/316 |
| 2014/0048506 A1* | 2/2014 | Suzuki | ................... | A61K 8/022 |
| | | | | 215/227 |
| 2015/0053792 A1* | 2/2015 | Deng | ................. | B05B 11/1074 |
| | | | | 239/373 |
| 2017/0144178 A1* | 5/2017 | Deng | ................. | B05B 11/0032 |
| 2020/0222629 A1* | 7/2020 | Deng | ............... | A61M 5/16813 |
| 2021/0002048 A1* | 1/2021 | Presche | ............. | B65D 51/2892 |

\* cited by examiner

FEEDING CONTAINER DEVICE

CROSS REFERENCE TO RELATED PATENT APPLICATION

The present application is a continuation in part application of the U.S. application Ser. No. 17/263,152.

The U.S. application Ser. No. 17/263,152 is the US national stage of PCT/CN2018/102387 filed on Aug. 27, 2018, which claims the priority of the CN201810834915.0 filed on Jul. 26, 2018.

The above-mentioned applications are incorporated herein by reference.

TECHNICAL FIELD

The present disclosure relates to the field of medicine feeding, in particular, to a feeding container device.

BACKGROUND

Nowadays, for medicaments (such as a powder, a granular formulation and a liquid medicament) which cannot be stored with the solvent for a long time, but requires mixing with the solvent while in use, the medicaments are generally sold consisting of the following three parts: a medicament with an independent package, a solvent with an independent package and a dosing device with an independent package. The dosing device generally consists of a container bottle and a spray pump that can be fixedly connected to the container bottle. While in use, independent packages of the three components need to be removed respectively, then the powder/granular formulation/liquid medicament and the solvent are poured into the container bottle, the spray pump is mounted on the solvent bottle, and the powder/granular formulation/liquid medicament and the solvent are shaken up for use in the form of a spray through the spray pump. However, a product of the above-mentioned structure has the following defects: a lot of independent packages are used, the operations are complicated, many formulation processes are used, it is easy to have error, and has certain requirements for an operator, therefore, such product is not convenient for the patient to use.

SUMMARY

The present disclosure provides a feeding container device with fewer packages and extremely convenient to operate.

The present disclosure provides a feeding container device, including a bottle body having a bottle inner cavity, a first cover body at least partially disposed inside the bottle inner cavity and fixedly connected to the bottle body, a second cover body at least partially disposed inside the bottle inner cavity and having a cover inner cavity, a sealing ring disposed inside the bottle inner cavity and blocking the cover inner cavity, and a feeding device fixedly connected to the second cover body. The second cover body is mounted to the bottle body or the first cover body, and moves along the bottle body or the first cover body; the sealing ring is detachably connected to the second cover body and abuts the first cover body; the bottle body, the first cover body and the sealing ring form a first sealed chamber; the second cover body and the sealing ring form a second sealed chamber; the feeding device has a feeding end located inside the first sealed chamber and a discharging end disposed outside the bottle body; when the second cover body moves away from the bottle body, the first cover body causes the sealing ring to separate from the second cover body, and the first sealed chamber communicates with the second sealed chamber. The second cover body further includes a first anti-theft ring, the first anti-theft ring is in point connection with the outer cover connection part; a first rotation preventing tooth is fixedly arranged on an outer circumferential surface of the inner cover connection part of the first cover body; the first rotation preventing tooth is engaged with the first anti-theft ring.

Further, the first sealed chamber and the second sealed chamber are respectively used for storing a liquid and a solid.

Further, the first sealed chamber and the second sealed chamber are respectively used for storing a solvent and a medicament, and the medicament is a solid or liquid medicament.

Further, the sealing ring and the second cover body are fixed in tight fit.

Further, the second cover body includes a cover inner ring and a cover outer ring disposed at the outer circumference of the cover inner ring.

Further, the second cover body further includes a cover channel for passing the feeding device within the cover inner ring.

Further, the feeding device includes a liquid suction pipe, a liquid guide/suction assembly, and a pressing head which are connected in sequence, wherein the liquid suction pipe and the liquid guide/suction assembly are penetrated in the cover channel.

Further, the second cover body further includes an outer cover connection part disposed at the outer circumference of the cover outer ring; the cover inner cavity is formed between the cover inner ring and the cover outer ring; the first cover body is disposed between the cover outer ring and the outer cover connection part, the first cover body including a cover main body and an inner cover connection part located at the outer circumference of the cover main body; and the outer cover connection part of the second cover body is in threaded connection with the inner cover connection part of the first cover body, the cover inner ring and the cover outer ring of the second cover body and the cover main body of the first cover body are all at least partially located inside the bottle inner cavity of the bottle body.

Further, the sealing ring has an inner connection slot in tight fit with the cover inner ring and an outer connection slot in tight fit with the cover outer ring.

Further, the sealing ring includes a sealed main body, and a first protrusion, a second protrusion, a third protrusion and a fourth protrusion which all extend from an end face facing the second cover body of the sealed main body and which are arranged sequentially from inside to outside; the inner connection slot is formed between the first protrusion and the second protrusion; the outer connection slot is formed between the third protrusion and the fourth protrusion; the fourth protrusion also abuts a cover main body of the first cover body.

Further, the first protrusion, the second protrusion, the third protrusion and the fourth protrusion are all of a cylindrical shape.

Further, heights of the first protrusion, the second protrusion, the third protrusion and the fourth protrusion increase one after another.

Further, the sealing ring further has a through-hole formed in the sealed main body.

Further, the bottle body has a bottle neck located between the cover main body and the inner cover connection part of the first cover body, and the bottle neck is fixedly connected with the cover main body and/or the inner cover connection part.

Further, a snap is arranged on an inner circumferential surface of the inner cover connection part, and a groove is arranged on an outer circumferential surface of the bottle neck, and the snap is snap-fitted to the groove.

Further, the second cover body has a connection neck located outside the bottle body, the feeding device has a feeding connection cover located outside the bottle body, and the connection neck is accommodated within the feeding connection cover and is in threaded connection with the feeding connection cover.

Further, the feeding device further includes a second anti-theft ring, the second anti-theft ring is fixedly connected with the feeding connection cover, a second rotation preventing tooth is fixedly arranged on an outer circumferential surface of the connection neck of the second cover body, and the second rotation preventing tooth is engaged with the second anti-theft ring.

Further, the second anti-theft ring is integrated with the feeding connection cover.

Further, the bottle body, the first cover body, the second cover body and the sealing ring are integrated, respectively.

Further, the feeding device is a spray pump. As described above, the feeding container device in the present disclosure has the following beneficial effects:

In the present application, in an unused state, the sealing ring separates the first sealed chamber from the second sealed chamber, such that the objects stored in the first sealed chamber are independent from those stored in the second sealed chamber. While in use, the second cover body is moved in a direction away from the bottle body, then the first cover body abuts the sealing ring, such that the sealing ring is disengaged from the second cover body. Thus, the objects stored in the first sealed chamber can be mixed with those stored in the second sealed chamber, and the mixture is transferred from the first sealed chamber by the feeding device. Therefore, the present application separately stores different objects using one independent package. When in use, the only operation needed is to move the second cover body. The present application has fewer packages, is very easy to operate, and is particularly suitable for use by a patient.

COMPONENT REFERENCE NUMERALS

Figure 1:
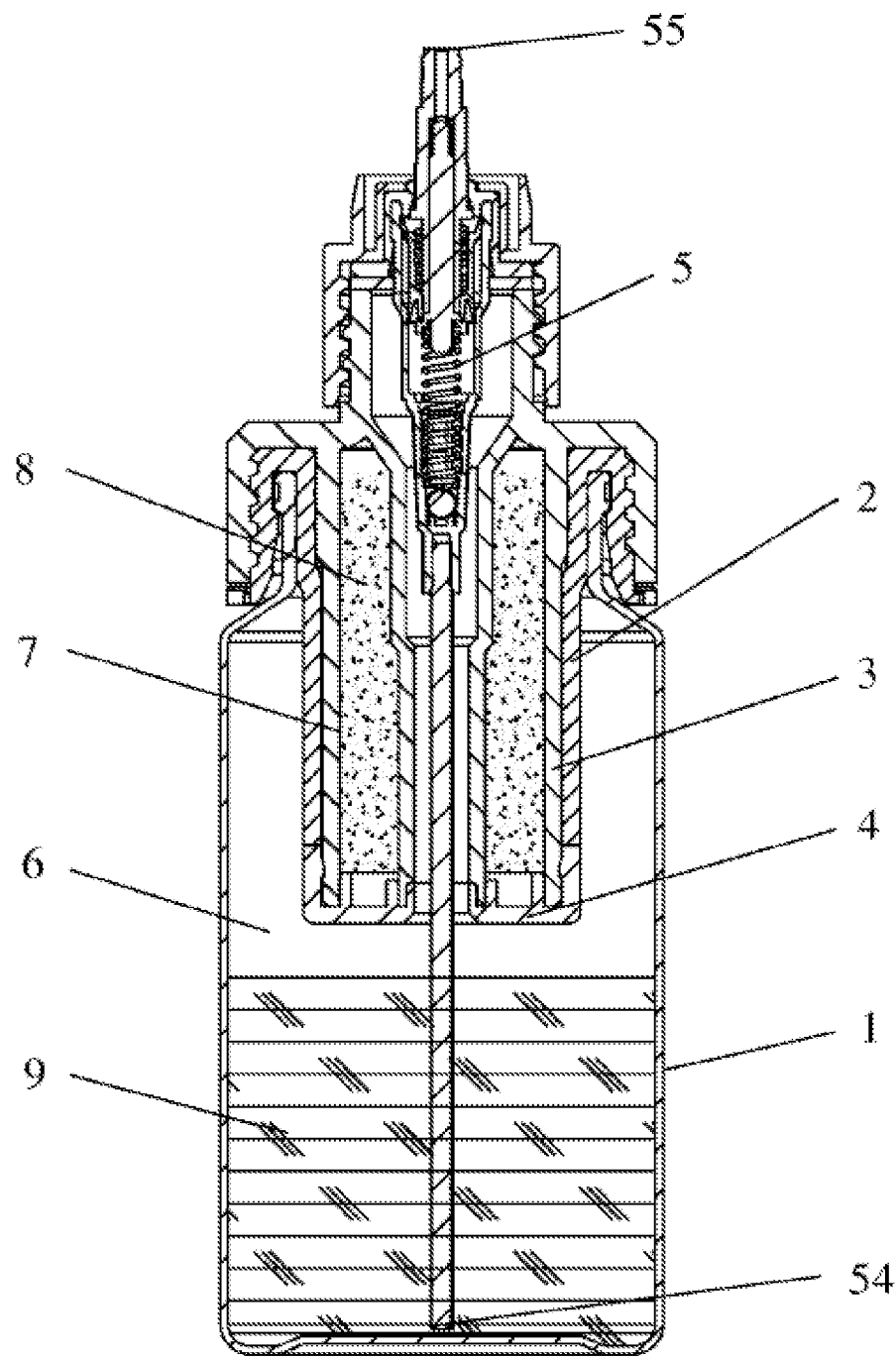
FIG. 1 is a structural schematic view of a feeding container device in embodiment I of the present application in a packaged state.

1 Bottle body
11 Bottle main body
12 Bottle bottom
13 Bottle neck
14 Bottle connection part
15 Bottle inner cavity
16 Groove
2 First cover body
21 Cover main body
22 First cover connection part
23 Inner cover connection part
24 Installation cavity
25 Snap
26 First rotation preventing tooth
3 Second cover body
31 Cover inner ring
32 Cover outer ring
33 Second cover connection part
34 Connection neck
35 Third cover connection part
36 Outer cover connection part
37 Cover inner cavity
38 Cover channel
39 First anti-theft ring
310 Second rotation preventing tooth
4 Sealing ring
41 Seal main body
42 First protrusion
43 Second protrusion
44 Third protrusion
45 Fourth protrusion
46 Inner connection slot
47 Outer connection slot
48 Through hole
5 Feeding device
51 Liquid suction pipe
52 Liquid guide/suction assembly
53 Pressing head
54 Feeding end
55 Discharging end
56 Feeding connection cover
57 Second anti-theft ring
6 First sealed chamber
7 Second sealed chamber
8 Medicament
9 Solvent

DETAILED DESCRIPTION OF THE PREFERRED EMBODIMENTS

Implementations of the present disclosure are described by specific detailed examples hereinafter, and those skilled in the art will readily understand the other advantages and functions of the present disclosure according to the contents disclosed by the present description.

It shall be understood that, structures, scales, sizes and the like depicted in the accompanying drawings of the present description are merely used for cooperating with the content disclosed by the description for understanding and reading by those skilled in the art, rather than for defining limitations for applying the present disclosure, and thus have no technically substantive meanings. Any modification to a structure, any change to a proportional relationship or any adjustment to a size shall fall within the range covered by the technical content disclosed by the present disclosure without affecting functions and objectives to be achieved by the present disclosure. Meanwhile, terms cited in the present description such as "upper", "lower", "left", "right", "middle" and "one/a/an" are only for the convenience of clear description, rather than for limiting the range within which the present disclosure can be implemented; any change or adjustment to the relative relationships shall be deemed as a range within which the present disclosure can be implemented without any substantive change to the technical content.

The present application provides a feeding container device for packaging at least one type of objects, particularly suitable for packaging two different objects, such that the two objects are separated before use and can be mixed when in use. The feeding container device involved in the present application is suitable for multiple fields such as packaging for medicines and granule type beverages.

Figure 2:
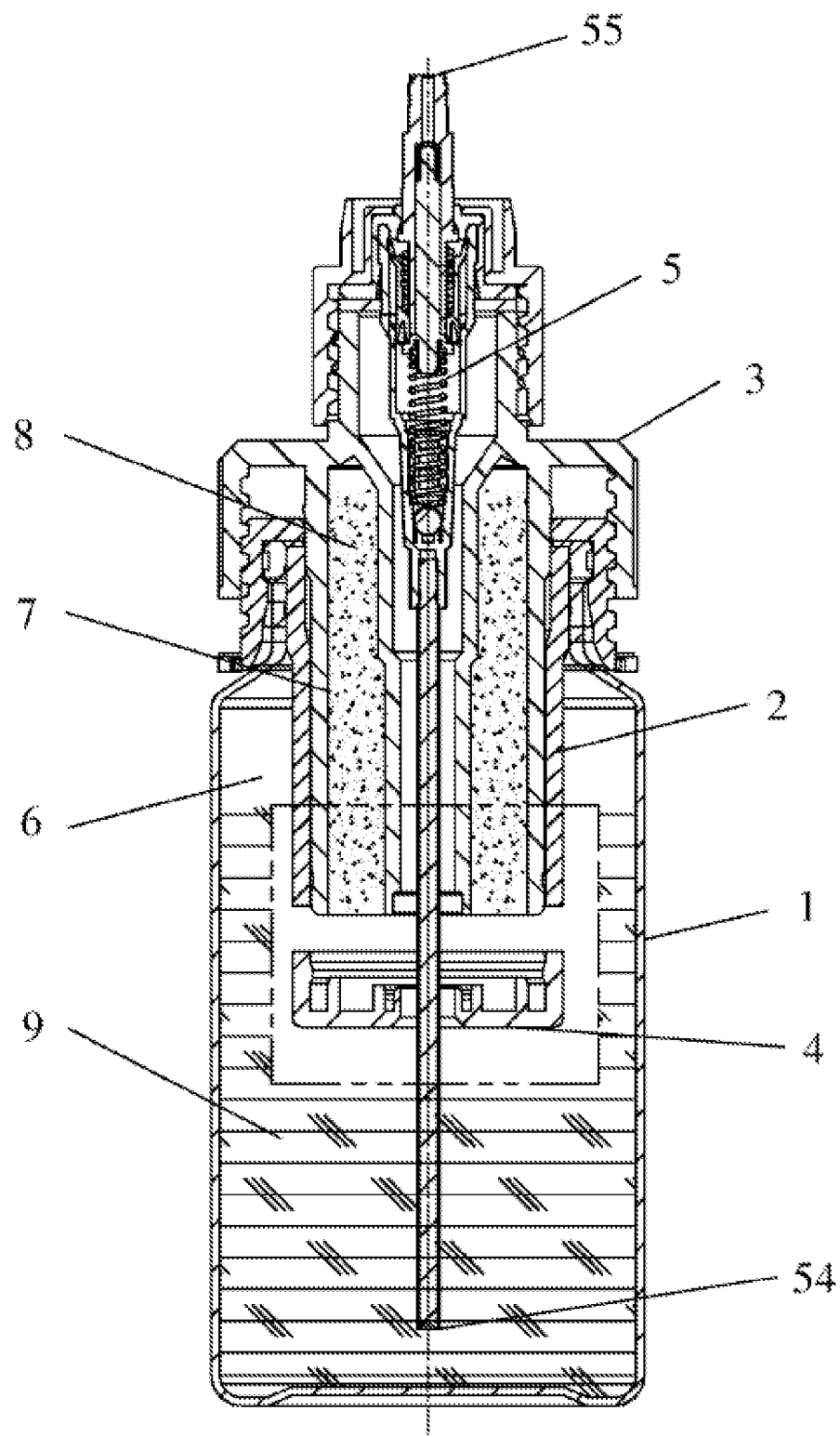
FIG. 2 is a structural schematic view of the feeding container device in embodiment I of the present application in a state of use.

As shown in FIGS. 1 and 2, the feeding container device mainly includes a bottle body 1, a first cover body 2, a second cover body 3, a sealing ring 4, and a feeding device 5. The bottle body 1 has a bottle inner cavity 15 with an opening facing upward. The first cover body 2 is at least partially disposed inside the bottle inner cavity 15 of the bottle body 1, and the first cover body 2 is fixedly connected to an upper end of the bottle body 1. The second cover body 3 has a cover inner cavity 37 with an opening facing downward. The second cover body 3 is at least partially disposed inside the bottle inner cavity 15 of the bottle body 1, such that at least part of the cover inner cavity 37 is disposed inside the bottle inner cavity 15 of the bottle body 1. The second cover body 3 is mounted to the bottle body 1 or the first cover body 2, and can move along the bottle body 1 or the first cover body 2. The sealing ring 4 as a whole is disposed inside the bottle inner cavity 15 of the bottle body 1. The sealing ring 4 is detachably connected to a lower end of the second cover body 3 and abuts a lower end of the first cover body 2. The sealing ring 4 blocks the lower opening of the cover inner cavity 37 in the second cover body 3. The feeding device 5 is fixedly connected to the second cover body 3, and the feeding device 5 includes a feeding end 54 and a discharging end 55.

After the bottle body 1, the first cover body 2, the second cover body 3, the sealing ring 4 and the feeding device 5 are assembled, the first cover body 2 and the second cover body 3 block the upper opening of the bottle inner cavity 15 of the bottle body 1. At this time, the bottle body 1, the first cover body 2 and the sealing ring 4 form a first sealed chamber 6, and the second cover body 3 and the sealing ring 4 form a second sealed chamber 7. A feeding end of the feeding device 5 is disposed inside the first sealed chamber 6 and a discharging end 55 is disposed outside the bottle body 1. Both the first sealed chamber 6 and the second sealed chamber 7 are used for storing objects.

When the feeding container device with packaged objects is in an unused state (i.e. in a packaged state), as shown in FIG. 1, the sealing ring 4 is connected to the lower end of the second cover body 3 and separates the first sealed chamber 6 from the second sealed chamber 7, such that the objects stored in the first sealed chamber 6 are independent from those stored in the second sealed chamber 7. Therefore, the objects in the first sealed chamber 6 are prevented from contacting the objects in the second sealed chamber 7, the objects will not deteriorate.

When the feeding container device with packaged objects is in use, a user moves the second cover body 3 upward in a direction away from the bottle body 1 and the first cover body 2. Driven by the second cover body 3, the sealing ring 4 also has a trend of moving upward. However, since the first cover body 2 is fixed on the bottle body 1 and the first cover body 2 abuts the sealing ring 4, the first cover body 2 limits the upward movement of the sealing ring along with the second cover body 3, such that the sealing ring 4 is separated from the second cover body 3, as shown in FIG. 2. At this time, the first sealed chamber 6 communicates with the second sealed chamber 7, the objects stored in the first sealed chamber 6 drop into the second sealed chamber 7, and will mix with the objects stored in the second sealed chamber 7. The mixture is then transferred out of the first sealed cavity 6 by the feeding device 5 for use. Therefore, the present application separates different objects by using one independent package. When in use, the only operation needed is to move the second cover body 3 upward. The present application has fewer packages and is very easy to operate. Thus, the feeding container device in the present application is particularly suitable for medicine packaging.

The first sealed chamber 6 and the second sealed chamber 7 respectively store a liquid and a solid. When the feeding container device is used for medicine packaging, the first sealed chamber 6 and the second sealed chamber 7 respectively store a solvent 9 and a medicament 8. The medicament 8 is a solid or liquid medicament. For example, the first sealed chamber 6 stores the solvent 9, and the second sealed chamber 7 stores a powder or a granular formulation or a liquid medicament. In an embodiment, the first sealed chamber 6 stores the solvent 9 and the second sealed chamber 7 stores the medicament 8 (a powder, or a granular formulation, or a liquid medicament), and a preferred structures of the feeding container device which includes the bottle body 1, the first cover body 2, the second cover body 3, the sealing ring 4 and the feeding device 5 are illustrated.

Figure 3:
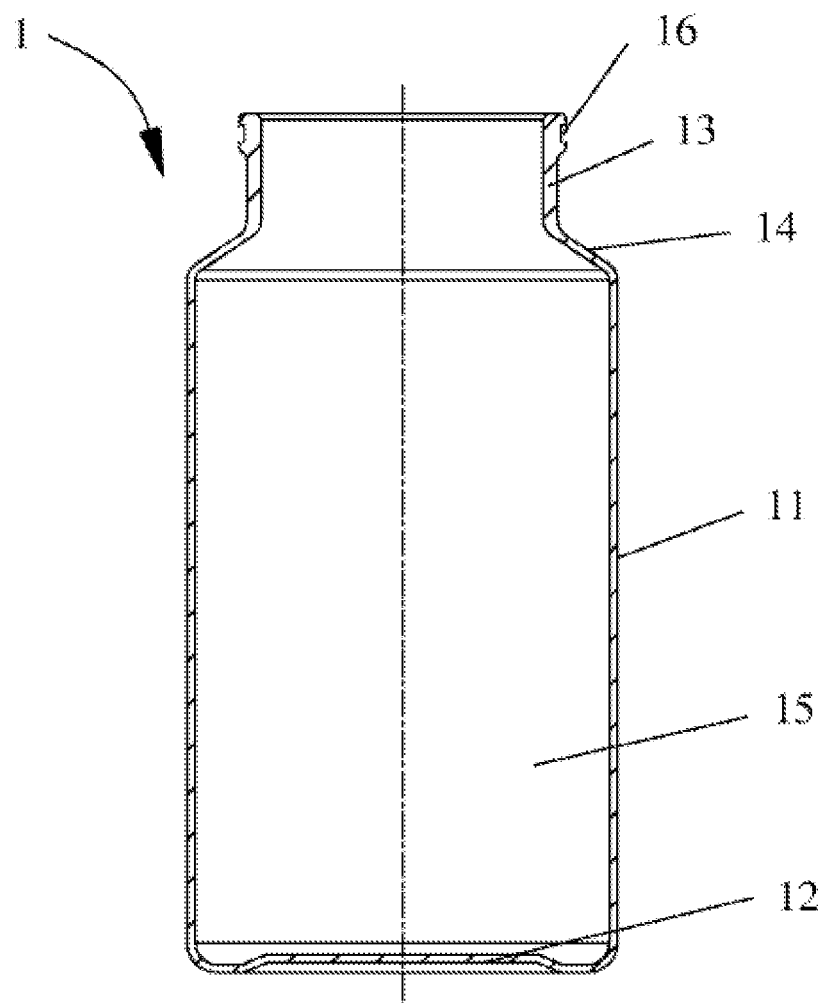
FIG. 3 is a structural schematic view of a bottle body in FIG. 1.

Bottle body 1: as shown in FIG. 3, the bottle body 1 includes a bottle main body 11 of a cylindrical shape, a bottle bottom 12 arranged at a lower end of the bottle main body 11, a bottle neck 13 extending upward from an upper end of the bottle main body 11 and having an outer diameter less than that of the bottle main body 11, and a bottle connection part 14 connected between the bottle main body 11 and the bottle neck 13. A cavity surrounded by the bottle main body 11, the bottle bottom 12, the bottle connection part 14 and the bottle neck 13 constitutes a bottle inner cavity 15 of the bottle body 1. The bottle neck 13 connects with the first cover body 2 and fixes the bottle body 1 and the first cover body 2. Preferably, the bottle body 1 is integrated.

Figure 4:
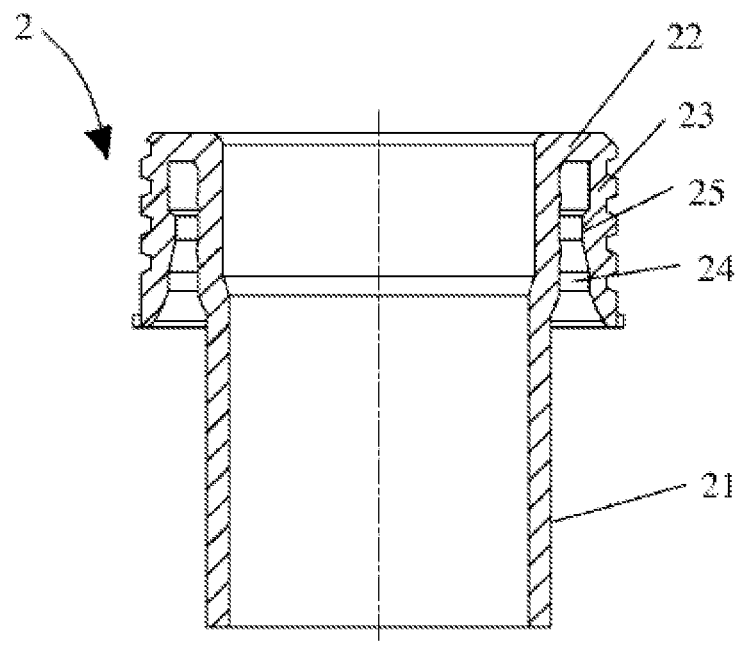
FIG. 4 is a structural schematic view of a first cover body in FIG. 1.

First cover body 2: as shown in FIG. 4, the first cover body 2 includes a cover main body 21 of a cylindrical shape, a first cover connection part 22 extending radially outward from an upper end of the cover main body 21, and an inner cover connection part 23 extending downward from an outer end of the first cover connection part 22. The inner cover connection part 23 also has a cylindrical shape and is disposed at the outer circumference of the cover main body 21. The inner cover connection part 23 has threads on an outer circumferential surface. An installation cavity 24 is formed between the inner cover connection part 23 and the cover main body 21. The installation cavity 24 allows the insertion of the bottle neck 13 of the bottle body 1, the bottle neck 13 is connected with the first cover body 2. Preferably, the first cover body 2 is integrated.

Figure 5:
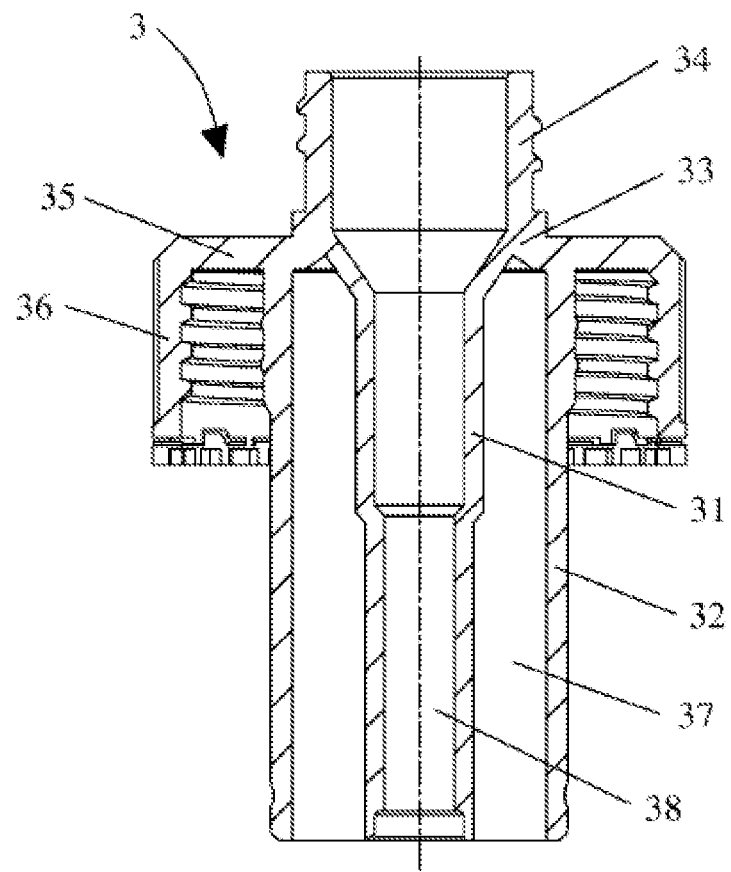
FIG. 5 is a structural schematic view of a second cover body in FIG. 1.

Second cover body 3: as shown in FIG. 5, the second cover body 3 includes a cover inner ring 31 of a cylindrical shape, a cover outer ring 32 disposed at the outer circumference of the cover inner ring 31, a second cover connection part 33 connected between an upper end of the cover inner ring 31 and an upper end of the cover outer ring 32, a connection neck 34 extending upward from an upper end of the second cover connection part 33, a third cover connection part 35 extending radially outward from an upper end of the cover outer ring 32, and an outer cover connection part 36 extending downward from an outer end of the third cover connection part 35. The outer cover connection part 36 has a cylindrical shape and is disposed at the outer circumference of the cover outer ring 32. The connection neck 34 also has a cylindrical shape. The outer cover connection part 36 has threads y on an inner circumferential surface, and the connection neck 34 has threads on an outer circumferential surface. A cavity surrounded by the cover inner ring 31, the cover outer ring 32 and the second cover connection part 33 constitutes a cover inner cavity 37 of the second cover body 3. A cover channel 38 is formed at an inner circumference of the connection neck 34 and at an inner circumference of the cover inner ring 31 in the second cover body 3. Preferably, the second cover body 3 is integrated. The cover channel 38 is within the cover inner ring 31 for passing the feeding device.

Figure 6:
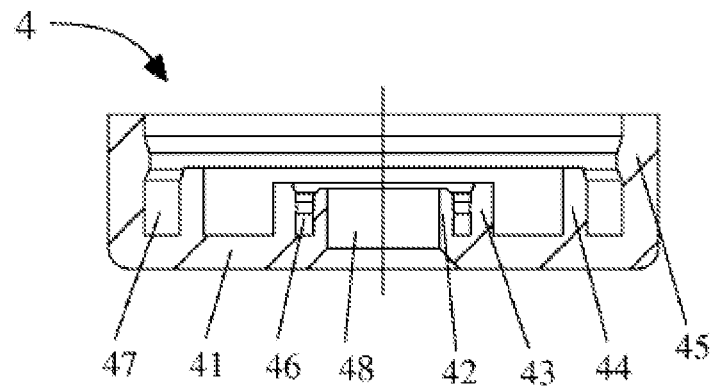
FIG. 6 is a structural schematic view of a sealing ring in FIG. 1.

Sealing ring 4: as shown in FIG. 6, the sealing ring 4 includes a sealed main body 41 of a disc shape, and a first protrusion 42, a second protrusion 43, a third protrusion 44 and a fourth protrusion 45 which all extend upward from an upper end face facing the second cover body 3 of the sealed main body 41 and which are arranged sequentially from inside to outside. The first protrusion 42, the second protrusion 43, the third protrusion 44 and the fourth protrusion 45 are all of a cylindrical shape. Heights of the first protrusion 42, the second protrusion 43, the third protrusion 44 and the fourth protrusion 45 increase one after another. The sealing ring 4 also has an inner connection slot 46 formed between the first protrusion 42 and the second protrusion 43, an outer connection slot 47 formed between the third protrusion 44 and the fourth protrusion 45, and a through-hole 48 formed in the sealed main body 41. Preferably, the sealing ring 4 is integrated.

Figure 7:
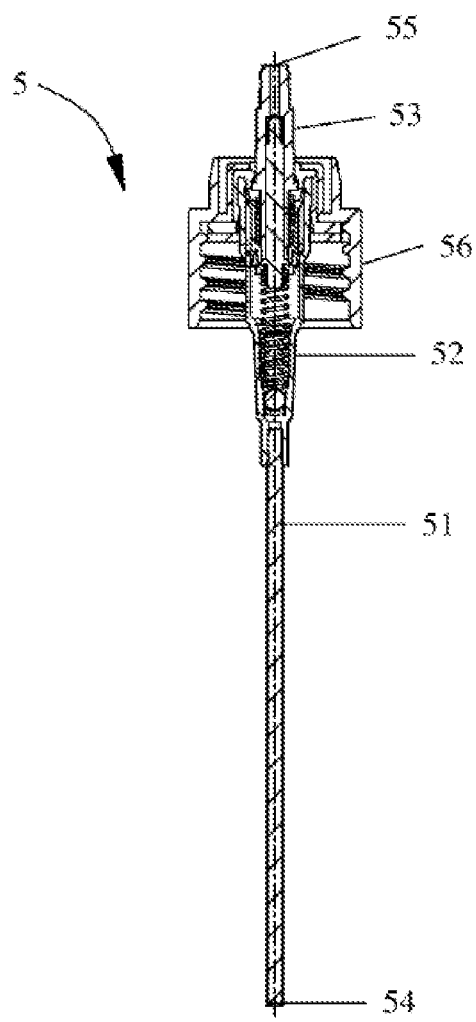
FIG. 7 is a structural schematic view of a feeding device in FIG. 1.
Figure 8:
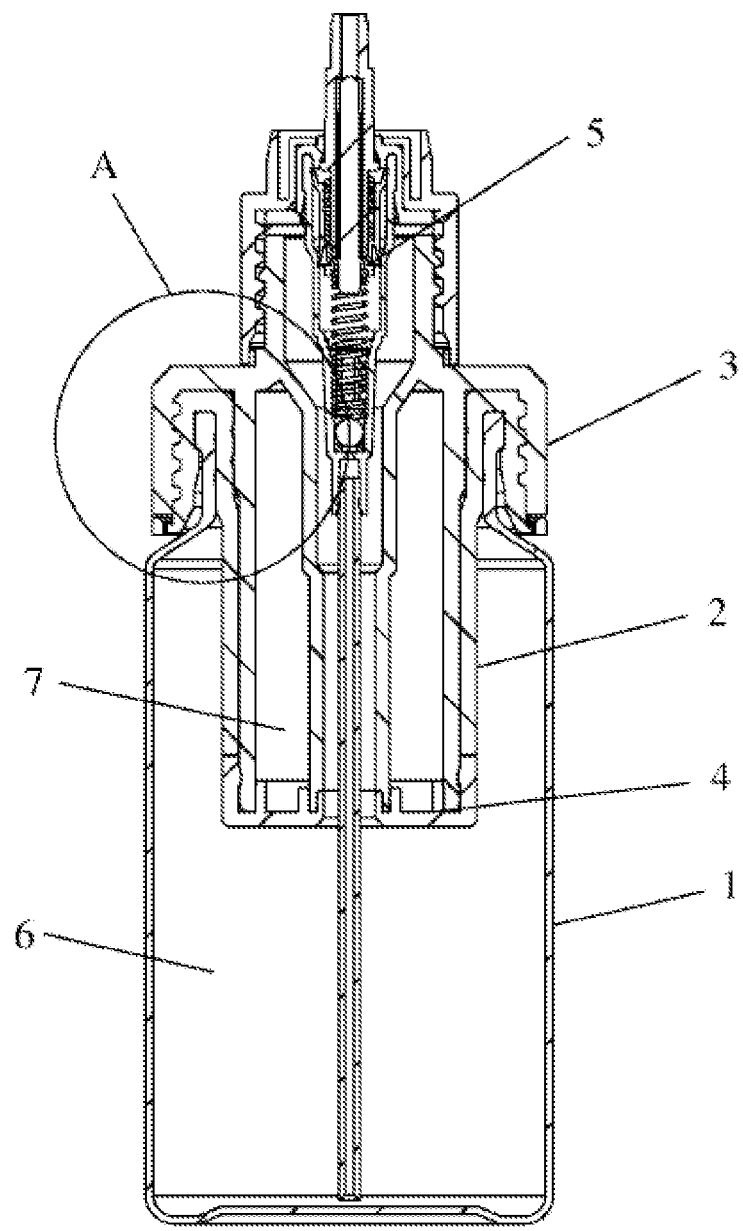
FIG. 8 is a structural schematic view of the feeding container device in embodiment II of the present application in a packaged state.
Figure 9:
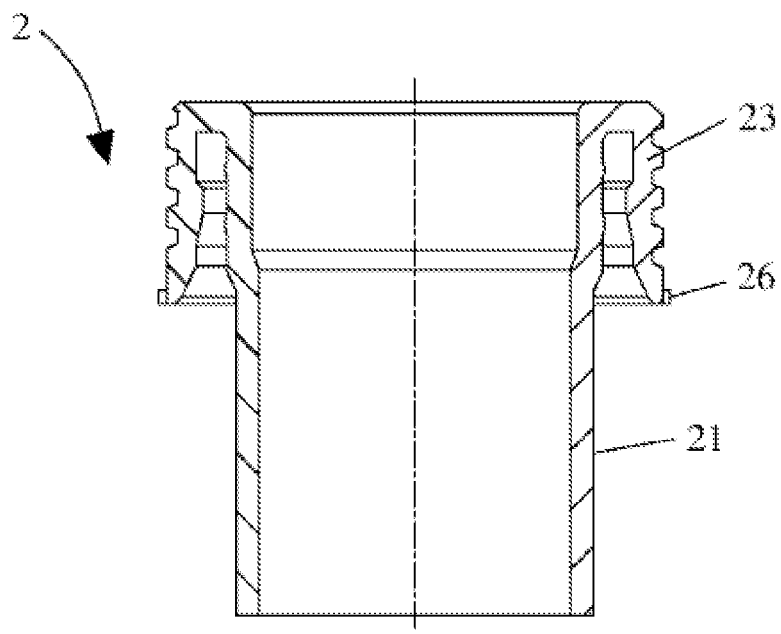
FIG. 9 is a structural schematic view of a first cover body in FIG. 8.
Figure 10:
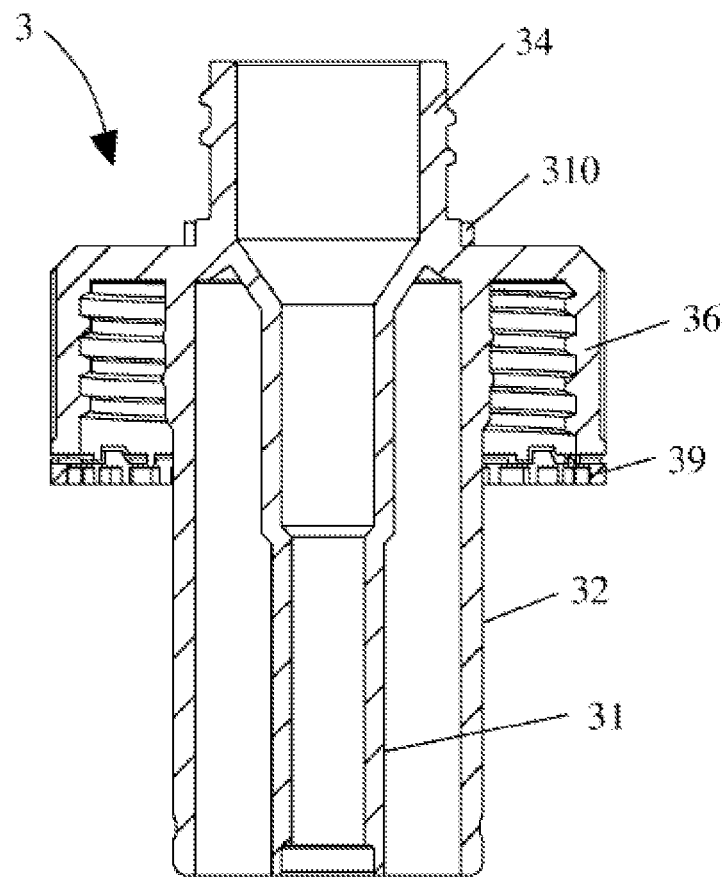
FIG. 10 is a structural schematic view of a second cover body in FIG. 8.
Figure 11:
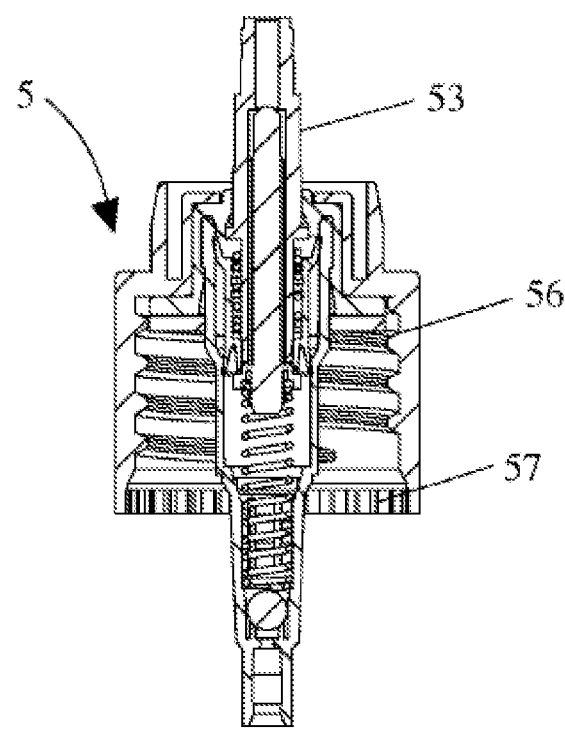
FIG. 11 is a structural schematic view of the feeding device at a feeding connection cover in FIG. 8.
Figure 12:
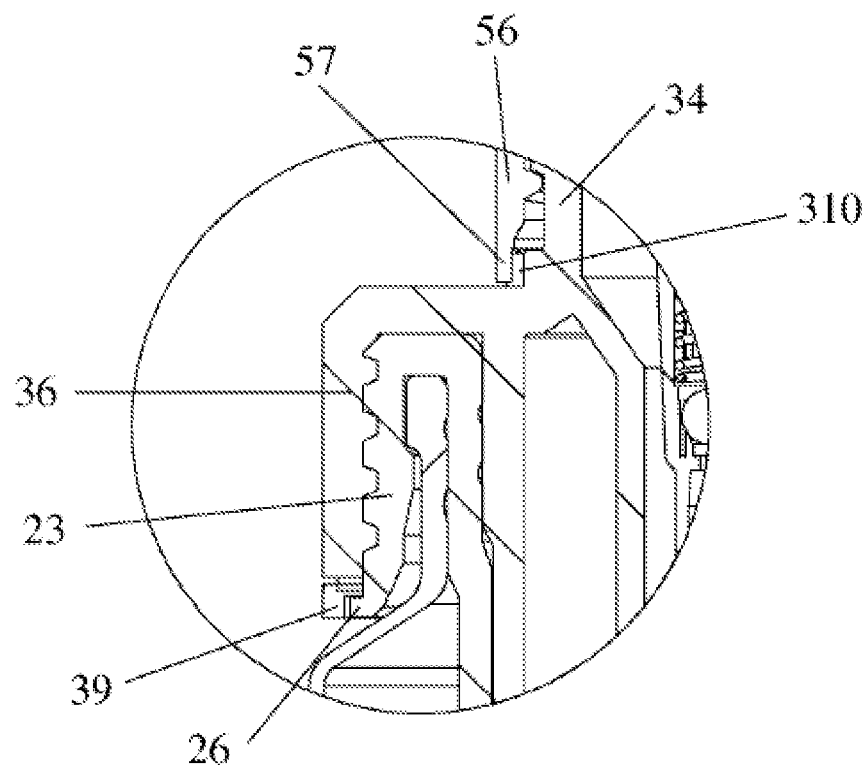
FIG. 12 is an enlarged view of the circle A in FIG. 8.

Feeding device 5: as shown in FIG. 7, the feeding device 5 is a spray pump and the structure of the spray pump is the prior art, and thus a detailed description thereof is omitted in the present description. In short, the spray pump mainly includes: a liquid suction pipe 51, a liquid guide/suction assembly 52 and a pressing head 53 which are connected in sequence from top to bottom. A feeding connection cover 56 is further fixedly connected to the outer circumference of the liquid guide/suction assembly 52 of the spray pump. The feeding connection cover 56 has threads on an inner circumferential surface. A lower end of the liquid suction pipe 51 constitutes the feeding end 54 of the feeding device 5, and a nozzle of the pressing head 53 constitutes the discharging end 55 of the feeding device 5.

Further, when the bottle body 1, the first cover body 2, the second cover body 3, the sealing ring 4 and the feeding device 5 are assembled, the connection relationships are as follows: as shown in FIG. 1, the first cover body 2 is fixed on the bottle neck 13 of the bottle body 1, the bottle neck 13 is disposed inside the installation cavity 24 of the first cover body 2. That is to say, the bottle neck is disposed between the cover main body 21 and the inner cover connection part 23 of the first cover body 2. The bottle neck 13 is fixedly connected with the cover main body 21 and/or the inner cover connection part 23, and further fixes the first cover body 2 and the bottle body 1. The first cover body 2 is disposed between the cover outer ring 32 and the outer cover connection part 36 of the second cover body 3. The outer cover connection part 36 of the second cover body 3 is in threaded connection with the inner cover connection part 23 of the first cover body 2. The second cover body 3 is mounted to the first cover body 2, and can move along the first cover body 2. The cover inner ring 31 and the cover outer ring 32 of the second cover body 3 and the cover main body 21 of the first cover body 2 are all at least partially disposed inside the bottle inner cavity 15 of the bottle body 1. The sealing ring 4 is disposed at the lower ends of the first cover body 2 and the second cover body 3. Specifically, the cover inner ring 31 of the second cover body 3 is inserted in the inner connection slot 46 of the sealing ring 4 and is in tight fit with the inner connection slot 46. The cover outer ring 32 of the second cover body 3 is inserted in the outer connection slot 47 of the sealing ring 4 and is in tight fit with the outer connection slot 47. The sealing ring 4 and the second cover body 3 are fixed in tight fit, realizing a detachable connection between the sealing ring 4 and the second cover body 3.

A lower end face of the cover main body 21 of the first cover body 2 abuts an upper end face of the fourth protrusion 45 of the sealing ring 4. The connection neck 34 of the second cover body 3 is located outside the bottle body 1. The liquid suction pipe 51 and the liquid guide/suction assembly 52 of the feeding device 5 are penetrated in the cover channel 38 of the second cover body 3. The liquid suction pipe 51 of the feeding device 5 is penetrated in the through-hole 48 of the sealing ring 4. Meanwhile, the feeding connection cover 56 of the feeding device 5 covers the outer circumference of the connection neck 34 of the second cover body 3 and is in threaded connection with the connection neck 34, such that the feeding device 5 and the second cover body 3 are fixed. The feeding connection cover 56 of the feeding device 5 and the connection neck 34 of the second cover body 3 are both disposed outside the bottle body 1.

When the assembly is completed, the sealing ring 4 blocks the cover inner cavity 37 in the second cover body 3 to form the sealed second sealed chamber 7, thereby preventing the medicament 8 (a powder, a granular formulation or a liquid medicament) stored in the second sealed chamber 7 from leaking and pouring. Furthermore, the first cover body 2, the second cover body 3 and the feeding device 5 block the bottle inner cavity 15 of the bottle body 1 to form the sealed first sealed chamber 6, thereby preventing the solvent 9 stored in the second sealed chamber 7 from leaking and pouring. Moreover, the sealing ring 4 effectively separates the first sealed chamber 6 from the second sealed chamber 7, thereby preventing the medicament 8 from mixing with the solvent 9.

In addition, in the present application, the bottle neck 13 of the bottle body 1 is preferably connected with the inner cover connection part 23 of the first cover body 2, as shown in FIGS. 1, 3 and 4. A snap 25 is arranged on an inner circumferential surface of the inner cover connection part 23. A groove 16 is arranged on an outer circumferential surface of the bottle neck 13. The snap 25 is snap-fitted to the groove 16, and further fixes the bottle body 1 and the first cover body 2.

In the feeding container device of the above-mentioned structure, the medicament 8 (a powder, or a granular formulation, or a liquid medicament), the solvent 9 and the feeding device 5 (spray pump) are designed as a whole and use one independent package. Therefore, the feeding container device has fewer packages and is cost-saving. Particularly, when in use, a patient may rotate the second cover body 3, move the second cover body 3 upward relative to the bottle body 1 and the first cover body 2 without disengaging from the first cover body 2, the sealing ring 4 is stuck by the first cover body 2, such that the sealing ring 4 is disengaged from the second cover body 3 under stress, thereby opening the second sealed chamber 7. The medicament 8 (a powder, or a granular formulation or a liquid medicament) stored in the second sealed chamber 7 fall into the solvent 9 stored in the first sealed chamber 6. Then the patient may shake up the solvent 9 and press the pressing head 53 of the spray pump for administration. The operation is easy, and the possibility of misoperation can be significantly decreased. The feeding device 5 and the bottle body 1 do not need to be completely opened during use. In other words, the second cover body 3 does not need to be disengaged completely from the first cover body 2. Therefore no liquid medicament leakage is caused, and the safety in medicine use is greatly improved.

The above-mentioned structure is a preferred structure in embodiment I of the feeding container device. For further increasing the performance of the feeding container device, embodiment II of the feeding container device is provided hereinafter. The feeding container device includes, in addition to the above-mentioned structure in embodiment I of the feeding container device, an anti-theft structure is added at a junction of the second cover body 3 and the first cover body 2 and a junction of the second cover body 3 and the feeding device 5, making the feeding container device anti-theft. Specifically, as shown in FIGS. 8 to 12, an anti-theft structure arranged at a conjunction of the second cover body 3 and the first cover body 2 includes a first anti-theft ring 39 in point connection with the outer cover connection part 36 of the second cover body 3, and a first rotation preventing tooth 26 fixedly arranged at a lower end of an outer circumferential surface of the inner cover connection part 23 of the first cover body 2.

When the second cover body 3 is screwed in position during installation, the first rotation preventing tooth 26 is engaged with the first anti-theft ring 39, thereby preventing an accidental opening of the second cover body 3 when the feeding container device is not opened. While in use, a force is applied to screw the second cover body 3, the first anti-theft ring 39 is disengaged from the outer cover connection part 36 by means of the point connection between the first anti-theft ring 39 and the outer cover connection part 36. Then the second cover body is continuously screwed to make the second cover body 3 move upward.

Similarly, an anti-theft structure arranged at a junction of the second cover body 3 and the feeding device 5 includes a second anti-theft ring 57 fixedly connected with the feeding connection cover 56 of the feeding device 5, and a second rotation preventing tooth 310 fixedly arranged at a lower end of an outer circumferential surface of the connection neck 34 of the second cover body 3. The second anti-theft ring 57 may be integrated with the feeding connection cover 56. When the feeding device 5 is screwed in position during installation, the second rotation preventing tooth 310 is engaged with the second anti-theft ring 57. In combination with the second anti-theft ring 57 fixed to the feeding connection cover 56, the feeding connection cover 56 cannot rotate, and cannot be disengaged from the second cover body 3.

In summary, the feeding container device in the present application combines functions of internal storage of the medicament 8 (a powder, or a granular formulation, or a liquid medicament), internal storage of the solvent 9, preventing overturn, preventing leakage of medicament liquid, inside-medicament formulation, spray administration, anti-theft, etc. Only requires screwing the second cover body 3, and formulation of the medicament 8 (a powder, or a granular formulation, or a liquid medicament) with the solvent 9 can be realized. The operation is very simple and convenient, thereby greatly lowering operation difficulty in medicament formulation and administration, and greatly improving the convenience for use by a patient and the safety of administration. Therefore, the present disclosure has effectively overcome various disadvantages in the prior art and has a high utility value in the industry.

The above-mentioned examples are only for exemplary illustration of the principles and functions of the present disclosure, rather than for limiting the present disclosure. Any of those skilled in the art may make modifications or changes to the above-mentioned examples without departing from the spirit and scope of the present disclosure. Therefore, any equivalent modification or change made by any of those skilled in the art without departing from the spirit and technological thought disclosed in the present disclosure shall still be encompassed by the claims of the present disclosure.

What is claimed is:

1. A feeding container device, comprising:
a bottle body (1) having a bottle inner cavity (15);
a first cover body (2) at least partially disposed inside the bottle inner cavity (15) and fixedly connected to the bottle body (1);
a second cover body (3) at least partially disposed inside the bottle inner cavity (15) and having a cover inner cavity (37);
a sealing ring (4) disposed inside the bottle inner cavity (15) and blocking the cover inner cavity (37);
a feeding device (5) fixedly connected to the second cover body (3);
the second cover body (3) is mounted to the bottle body (1) or the first cover body (2), and moves along the bottle body (1) or the first cover body (2);
the sealing ring (4) is detachably connected to the second cover body (3) and abuts the first cover body (2);
the bottle body (1), the first cover body (2) and the sealing ring (4) form a first sealed chamber (6);
the second cover body (3) and the sealing ring (4) form a second sealed chamber (7);
the feeding device (5) has a feeding end (54) disposed inside the first sealed chamber (6) and a discharging end (55) disposed outside the bottle body (1);
when the second cover body (3) moves away from the bottle body (1), the first cover body (2) causes the sealing ring (4) to separate from the second cover body (3), and the first sealed chamber (6) communicates with the second sealed chamber (7);
wherein the second cover body (3) further comprises a first anti-theft ring (39), the first anti-theft ring (39) is in point connection with an outer cover connection part (36);
wherein a first rotation preventing tooth (26) is fixedly arranged on an outer circumferential surface of an inner cover connection part (23) of the first cover body (2);
wherein the first rotation preventing tooth (26) is engaged with the first anti-theft ring (39);
wherein the second cover body (3) comprises a cover inner ring (31) and a cover outer ring (32) disposed at the outer circumference of the cover inner ring (31);

wherein the second cover body (3) further comprises a cover channel (38) for passing the feeding device (5) within the cover inner ring (31);

wherein the feeding device (5) comprises a liquid suction pipe (51), a liquid guide/suction assembly (52), and a pressing head (53) which are connected in sequence, wherein the liquid suction pipe (51) and the liquid guide/suction assembly (52) are penetrated in the cover channel (38).

2. The feeding container device according to claim 1, wherein the first sealed chamber (6) and the second sealed chamber (7) are respectively used for storing a liquid and a solid.

3. The feeding container device according to claim 2, wherein the first sealed chamber (6) and the second sealed chamber (7) are respectively used for storing a solvent (9) and a medicament (8), and the medicament (8) is a solid or liquid medicament.

4. The feeding container device according to claim 1, wherein the sealing ring (4) and the second cover body (3) are fixed in tight fit.

5. The feeding container device according to claim 1, wherein the second cover body (3) further comprises:

an outer cover connection part (36) disposed at the outer circumference of the cover outer ring (32);

the cover inner cavity (37) is formed between the cover inner ring (31) and the cover outer ring (32);

the first cover body (2) is disposed between the cover outer ring (32) and the outer cover connection part (36);

the first cover body (2) comprising a cover main body (21) and an inner cover connection part (23) disposed at the outer circumference of the cover main body (21);

the outer cover connection part (36) of the second cover body (3) is in threaded connection with the inner cover connection part (23) of the first cover body (2);

the cover inner ring (31) and the cover outer ring (32) of the second cover body (3) and the cover main body (21) of the first cover body (2) are all at least partially disposed inside the bottle inner cavity (15) of the bottle body (1).

6. The feeding container device according to claim 1, wherein the sealing ring (4) has an inner connection slot (46) in tight fit with the cover inner ring (31) and an outer connection slot (47) in tight fit with the cover outer ring (32).

7. The feeding container device according to claim 6, wherein the sealing ring (4) comprises:

a sealed main body (41);

a first protrusion (42), a second protrusion (43), a third protrusion (44) and a fourth protrusion (45) which all extend from an end face facing the second cover body (3) of the sealed main body (41) and which are arranged sequentially from inside to outside;

the inner connection slot (46) is formed between the first protrusion (42) and the second protrusion (43);

the outer connection slot (47) is formed between the third protrusion (44) and the fourth protrusion (45); and the fourth protrusion (45) abuts a cover main body (21) of the first cover body (2).

8. The feeding container device according to claim 7, wherein the first protrusion (42), the second protrusion (43), the third protrusion (44) and the fourth protrusion (45) are all of a cylindrical shape.

9. The feeding container device according to claim 7, wherein heights of the first protrusion (42), the second protrusion (43), the third protrusion (44) and the fourth protrusion (45) increase one after another.

10. The feeding container device according to claim 7, wherein the sealing ring (4) further has a through-hole (48) formed in the sealed main body (41).

11. The feeding container device according to claim 5, wherein the bottle body (1) has a bottle neck (13) disposed between the cover main body (21) and the inner cover connection part (23) of the first cover body (2), and the bottle neck (13) is fixedly connected with the cover main body (21) and/or the inner cover connection part (23).

12. The feeding container device according to claim 11, wherein a snap (25) is arranged on an inner circumferential surface of the inner cover connection part (23), a groove (16) is arranged on an outer circumferential surface of the bottle neck (13), and the snap (25) is snap-fitted to the groove (16).

13. The feeding container device according to claim 1, wherein the second cover body (3) has a connection neck (34) disposed outside the bottle body (1), the feeding device (5) has a feeding connection cover (56) disposed outside the bottle body (1), and the connection neck (34) is accommodated inside the feeding connection cover (56) and is in threaded connection with the feeding connection cover (56).

14. The feeding container device according to claim 13, wherein the feeding device (5) further comprises a second anti-theft ring (57), the second anti-theft ring (57) is fixedly connected with the feeding connection cover (56);

a second rotation preventing tooth (310) is fixedly arranged on an outer circumferential surface of the connection neck (34) of the second cover body (3); and the second rotation preventing tooth (310) is engaged with the second anti-theft ring (57).

15. The feeding container device according to claim 14, wherein the second anti-theft ring (57) is integrated with the feeding connection cover (56).

16. The feeding container device according to claim 1, wherein the bottle body (1), the first cover body (2), the second cover body (3) and the sealing ring (4) are integrated, respectively.

17. The feeding container device according to claim 1, wherein the feeding device (5) is a spray pump.

* * * * *